United States Patent
Wang et al.

(10) Patent No.: US 11,862,818 B2
(45) Date of Patent: Jan. 2, 2024

(54) PARALLEL ELECTRICAL CONNECTION STRUCTURE FOR BATTERY POLES, A PARALLEL BATTERY BANK, A BATTERY PACK, AND A MANUFACTURING METHOD THEREOF

(71) Applicant: JIAXING MODU NEW ENERGY CO., LTD, Jiaxing (CN)

(72) Inventors: Bo Wang, Jiaxing (CN); Kang Yang, San Diego, CA (US); Xiaohong Zhang, Jiaxing (CN); Lingyun Huang, Jiaxing (CN)

(73) Assignee: JIAXING MODU NEW ENERGY CO., LTD, Jiaxing (CN)

( * ) Notice: Subject to any disclaimer, the term of this patent is extended or adjusted under 35 U.S.C. 154(b) by 0 days.

(21) Appl. No.: 18/192,972

(22) Filed: Mar. 30, 2023

(65) Prior Publication Data
US 2023/0318149 A1   Oct. 5, 2023

(30) Foreign Application Priority Data
Mar. 30, 2022   (CN) .......................... 202210321110.2

(51) Int. Cl.
*H01M 10/00*   (2006.01)
*H01M 50/509*   (2021.01)
(Continued)

(52) U.S. Cl.
CPC ....... *H01M 50/509* (2021.01); *H01M 50/213* (2021.01); *H01M 50/507* (2021.01); *H01M 50/514* (2021.01); *H01M 50/516* (2021.01)

(58) Field of Classification Search
CPC ............. H01M 50/509; H01M 50/213; H01M 50/507; H01M 50/514; H01M 50/516
See application file for complete search history.

(56) References Cited

U.S. PATENT DOCUMENTS

| 2012/0107651 A1 | 5/2012 | Hotta et al. |
| 2012/0135296 A1 | 5/2012 | Itoi et al. |
(Continued)

FOREIGN PATENT DOCUMENTS

| CN | 102473892 A | 5/2012 |
| CN | 202352759 U | 7/2012 |
(Continued)

*Primary Examiner* — Nicholas P D'Aniello
(74) *Attorney, Agent, or Firm* — Saliwanchik, Lloyd & Eisenschenk

(57) ABSTRACT

The present invention relates to a parallel electrical connection structure for battery poles, a parallel battery bank, a battery pack, and a manufacturing method thereof. The parallel electrical connection structure mainly comprises a common adjusting busway and a plurality of electrically connecting branches, the two ends of each of the electrically connecting branches are configured to be electrically connected to the poles of the same polarity of the plurality of individual batteries and the common adjusting busway, the poles of the same polarity of different individual batteries are connected in shunt via the common adjusting busway and the electrically connecting branches, and the current carrying capacity of each electrically connecting branch is smaller than that of the common adjusting busway. With the present invention, any battery with thermal runaway in a new energy battery pack can be discovered and isolated as early as possible, and the development of the thermal runaway in the battery can be blocked as soon as possible, to avoid negative effects of the battery with thermal runaway on other normal batteries in the battery pack and ensure the normal operation of the battery pack.

8 Claims, 3 Drawing Sheets

(51) Int. Cl.
  *H01M 50/516* (2021.01)
  *H01M 50/507* (2021.01)
  *H01M 50/213* (2021.01)
  *H01M 50/514* (2021.01)

(56) References Cited

U.S. PATENT DOCUMENTS

| | | |
|---|---|---|
| 2013/0122341 A1 | 5/2013 | De Paoli et al. |
| 2013/0143101 A1* | 6/2013 | Nakagawa ........ H01M 10/4207 |
| | | 429/157 |
| 2016/0254521 A1 | 9/2016 | Chatroux et al. |
| 2021/0203029 A1* | 7/2021 | Ahn ..................... G01R 31/396 |
| 2023/0049279 A1 | 2/2023 | Kim |

FOREIGN PATENT DOCUMENTS

| | | |
|---|---|---|
| CN | 202749439 U | 2/2013 |
| CN | 103038917 A | 4/2013 |
| CN | 20420945 U | 3/2015 |
| CN | 105449150 A | 3/2016 |
| CN | 205911353 U | 1/2017 |
| CN | 211990891 U | 11/2020 |
| CN | 113241491 A | 8/2021 |
| CN | 113258218 A | 8/2021 |
| FR | 3012915 A1 | 5/2015 |
| WO | 2013131588 A2 | 9/2013 |
| WO | 2021256673 A1 | 12/2021 |

\* cited by examiner

PARALLEL ELECTRICAL CONNECTION STRUCTURE FOR BATTERY POLES, A PARALLEL BATTERY BANK, A BATTERY PACK, AND A MANUFACTURING METHOD THEREOF

TECHNICAL FIELD

The present invention relates to the field of new energy power batteries, in particular to a parallel electrical connection structure for battery poles, a parallel battery bank, a battery pack, and a manufacturing method thereof.

Background Art

In the applications of power battery combined in groups, the capacity is increased usually by means of a parallel structure of individual batteries. In the battery grading for grouping, batteries that have very low differences in battery capacity, resistance and voltage among them are usually selected to form a parallel battery bank. Therefore, in the normal operating state, the current in the parallel busbars of a parallel battery bank is very low.

The thermal runaway of a power battery usually occurs in the form of an internal short circuit, i.e., the internal resistance is reduced gradually, till a short circuit occurs. Therefore, after the thermal runaway occurs in one battery in a parallel circuit, the current from all other batteries in a normal state in the parallel battery bank will flow backwards in first priority to the branch of the battery where thermal runaway exists. Consequently, the current in the branch connected with the battery with thermal runaway is increased sharply, accelerating the thermal runaway process of the battery and causing abnormal external discharge from the batteries in the normal state; as a result, the batteries in the normal state enter an overcurrent state. It is an urgent technical problem in the art to discover and electrically isolate a battery with thermal runaway as early as possible, i.e., block the development of the battery with thermal runaway the and the adverse effect of the battery on other normal batteries in the parallel battery bank as early as possible, and ensure that the battery pack can restore to normal operation as soon as possible.

SUMMARY OF THE INVENTION

The present invention discloses a parallel electrical connection structure for battery poles, a parallel battery bank, a battery pack, and a manufacturing method thereof, which is intended to solve the technical problems existing in the prior art.

The present invention employs the following technical solution:

In one aspect, the present invention provides a parallel electrical connection structure for battery poles, comprising a common adjusting busway and a plurality of electrically connecting branches, wherein both the common adjusting busway and the electrically connecting branches are conductors;

each of the electrically connecting branches has a first end and a second end; the first end of each electrically connecting branch is configured to be electrically connected to the poles of the same polarity or the electrically connecting element of the poles of the same polarity of the individual batteries, and the second end of each electrically connecting branch is electrically connected to the common adjusting busway; the poles of the same polarity of different individual batteries are connected in shunt via the common adjusting busway and the electrically connecting branches;

the common adjusting busway and each electrically connecting branch are insulated from the poles of the individual batteries, except the first end of each electrically connecting branch;

the cross section of each electrically connecting branch is smaller than the cross section of the common adjusting busway;

alternatively, the current carrying capacity of each electrically connecting branch is lower than the current carrying capacity of the common adjusting busway.

As a preferred technical solution, the plurality of electrically connecting branches has the same electrical resistance.

As a preferred technical solution, the current carrying capacity of the common adjusting busway is greater than or equal to the sum of the current carrying capacities of n−1 electrically connecting branches, wherein n is the number of all the electrically connecting branches electrically connected to the common adjusting busway.

As a preferred technical solution, the common adjusting busway and the plurality of electrically connecting branches are formed from a metal busbar having uniform thickness by punching; and the width of the common adjusting busway is greater than the width of each of the electrically connecting branches.

As a preferred technical solution, at least the first end of the electrically connecting branch is electrically connected to the poles of the individual batteries through a cold-welding adhesive bonding process, with conductive adhesive that cures at normal temperature as a filler material.

As a preferred technical solution, the first ends and the second ends are electrically connected through an ultrasonic jump wire bridging process between the poles or electrically connecting element electrically connected to the first ends and the common adjusting busway electrically connected to the second ends, so that the electrically connecting branches are formed simultaneously In another aspect, the present invention provides a parallel battery bank, which comprises:

a plurality of individual batteries, each of the individual batteries comprises a first pole and a second pole, wherein the first pole and the second pole are the two electrical poles of the individual battery;

the first poles of the plurality of individual batteries are connected in shunt via the parallel electrical connection structure for battery poles as described above, and the plurality of second poles are connected in shunt; and a plurality of parallel battery branches in which the individual batteries are connected with the electrically connecting branches is formed between the common adjusting busway and the second poles of the individual batteries.

The present invention further provides a battery pack, which comprises:

a plurality of series battery banks, each of the series battery banks is formed by arranging a plurality of individual batteries side by side, wherein each of the individual batteries comprises a first pole and a second pole, the first pole and the second pole are the two electrical poles of the individual battery;

at least the first poles of the plurality of first individual batteries adjacent to each other in the first place in different series battery banks are connected in shunt via the parallel electrical connection structure for battery poles, and at least the second poles of a plurality of individual batteries adjacent to each other in the last place in different series battery banks are connected in shunt, so that the plurality of series battery banks are connected in shunt; the parallel electrical connection structure for battery poles comprises a common adjusting busway and a plurality of electrically connecting branches; each of the electrically connecting branches has a first end and a second end; the first end of each electrically connecting branch is configured to be electrically connected to the first pole of one individual battery in a different series battery bank respectively, and the second end of each electrically connecting branch is electrically connected to the common adjusting busway; the common adjusting busway and the electrically connecting branches are insulated, except that the first ends of the electrically connecting branches are electrically connected to the first poles of corresponding individual batteries; and the current carrying capacity of each electrically connecting branch is lower than the current carrying capacity of the common adjusting busway.

As a preferred technical solution, the first end of the electrically connecting branch is electrically connected to the first pole through a cold-welding adhesive bonding process with conductive adhesive.

Finally, the present invention further provides a method for manufacturing a battery pack by using the parallel electrical connection structure for battery poles as described above, which comprises:
  preparing a plurality of series battery banks having a series busbar respectively;
  preparing a parallel electrical connection structure for battery poles;
  arranging the plurality of series battery banks in parallel, and at least applying insulating structural adhesive and curing the insulating structural adhesive between adjacent individual batteries in different series battery banks, so as to obtain a battery array structure in which adjacent individual batteries are insulated from each other and the structure is stable;
  fixing the common adjusting busway of the parallel electrical connection structure for battery poles to the individual batteries adjacent to each other in the same row in the transverse direction in an insulation manner;
  electrically connecting each electrically connecting branch to the top pole of each individual battery through a cold-welding adhesive bonding structure with conductive adhesive, so that the top poles of the individual batteries adjacent to each other in the same row in the transverse direction are connected in shunt;
  connecting the top poles of the individual batteries adjacent to each other in each of the plurality of rows in the transverse direction in shunt sequentially; and
  preparing and obtaining a battery pack having a stable structure, in which the batteries are connected in series in the longitudinal direction and connected in shunt in the transverse direction, and any individual battery with thermal runaway can be isolated from the parallel battery bank by over-current fusing function.

As a preferred technical solution, the step of preparing a plurality of series battery banks having a series busbar respectively further comprises:
  arranging a plurality of individual batteries having a series busbar in a row in the same orientation;
  at least applying insulating structural adhesive between adjacent individual batteries;
  electrically connecting the top pole and shell pole of adjacent individual batteries to the two ends of the series busbar respectively;
  curing the structural adhesive to obtain a series battery bank in which the individual batteries are adjacent to each other in a row in the longitudinal direction; and
  preparing and obtaining a plurality of series battery banks.

As a preferred technical solution, the step of preparing the parallel electrical connection structure for battery poles further comprises:
  using a metal busbar coated with an insulating material as the common adjusting busway;
  using a plurality of short metal strips electrically connected on the metal busbar as the electrically connecting branches for the parallel individual batteries adjacent to each other between corresponding adjacent series battery banks;
  applying conductive adhesive on the upper metal surface of the first end of each electrically connecting branch;
  preparing and obtaining a parallel electrical connection structure for battery poles, which has a plurality of electrically connecting branches and a common adjusting busway; and
  preparing and obtaining a plurality of parallel electrical connection structures for battery poles.

The technical solution of the present invention can achieve the following beneficial effects:

The present invention provides a parallel electrical connection structure for battery poles, a parallel battery bank, a battery pack, and a manufacturing method thereof. The parallel electrical connection structure for battery poles mainly comprises a common adjusting busway and a plurality of electrically connecting branches, the two ends of each of the electrically connecting branches are configured to be electrically connected to the poles of the same polarity of the plurality of individual batteries and the common adjusting busway, and the poles of the same polarity of different individual batteries are connected in shunt via the common adjusting busway and the electrically connecting branches; furthermore, the current carrying capacity of each electrically connecting branch is smaller than the current carrying capacity of the common adjusting busway. When the parallel electrical connection structure is applied in a parallel battery bank, in the case that thermal runaway occurs in a battery in the parallel battery bank, the internal resistance of the battery will be decreased, and the internal current in the battery will be increased, the incremental current from the other batteries in a normal state in the parallel battery bank will reach the dedicated electrically connecting branch for the battery with thermal runaway through the common adjusting busway, the current in the electrically connecting branch will exceed the current carrying capacity limit of the electrically connecting branch owing to the accumulated incremental current from a plurality of normal batteries, thereby the electrically connecting branch will be fused and burnt quickly owing to overcurrent, while the dedicated electrically connecting branches of the normal batteries can operate normally since the current in these electrically connecting branches hasn't reached the current carrying capacity limit. In that way, the battery with thermal runaway is electrically isolated from the parallel battery bank. After the battery with thermal runway is isolated, the current in the electrically connecting branches of the normal batteries in the parallel battery bank will return to the normal state.

The parallel electrical connection structure for battery poles described above is applicable to battery grouping applications in new energy vehicles or large-size energy storage systems. The parallel electrical connection structure for battery poles is small in size and easy to install, and can effectively protect the circuit of the entire battery pack for safe operation. With the parallel electrical connection structure for battery poles, any battery with thermal runaway can be discovered and isolated as early as possible, and the development of battery with thermal runaway can be blocked as soon as possible, to avoid the adverse effects of the battery with thermal runaway on the other normal batteries in the battery pack and ensure the normal operation of the battery pack. Thus, a severe pain point in the field of new energy power batteries is solved successfully.

DESCRIPTION OF DRAWINGS

In order to explain the technical solution of the examples of the present invention more clearly, hereunder the accompanying drawings, which will be used in the description of the examples and constitute a part of the present invention, will be described briefly. The exemplary examples of the present invention and associated description are intended to explain the present invention but don't constitute any undue limitation to the present invention. In the figures.

DESCRIPTION OF THE REFERENCE NUMBERS

Figure 1:
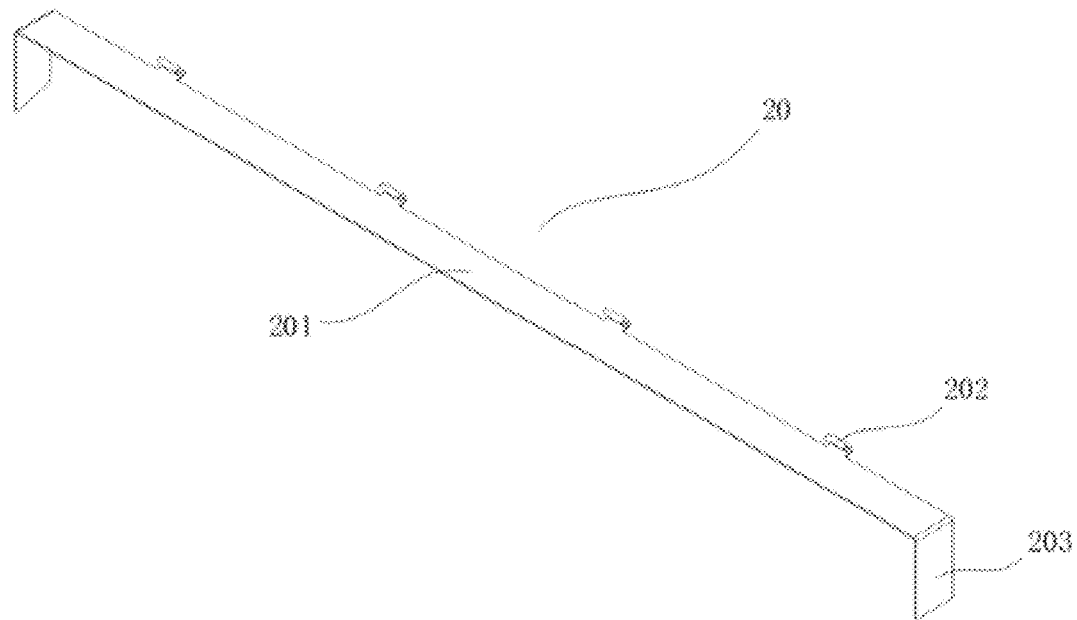
FIG. 1 is a schematic structural diagram of the parallel electrical connection structure for battery poles disclosed in examples 1 to 4 of the present invention.

10—individual battery, 101—top pole, 102—shell pole;
20—parallel electrical connection structure, 201—common adjusting busway, 202—electrically connecting branch, 203—bending structure, 204—large insulating plate;
30—series busbar; 40—structural adhesive.

EMBODIMENTS

To make the object, technical solution, and advantages of the present invention understood more clearly, hereunder the technical solution of the present invention will be detailed clearly and completely in examples, with reference to the accompanying drawings of the present invention. In the description of the present invention, it should be noted that the term "or" is usually used with the meaning of including "and/or", unless otherwise indicated explicitly in the context.

It should be noted: in the description of the present invention, unless otherwise specified and defined explicitly, the terms "install", "interconnect", and "connect" shall be interpreted in their general meanings, for example, a connection may be a fixed connection, a detachable connection, or an integral connection; a connection may be a mechanical connection or an electrical connection; or a connection may be a direct connection or an indirect connection via an intermediate medium, or internal communication between two elements. Those of ordinary skill in the art can understand the specific meanings of the terms in the present invention in their context. Besides, in the description of the present invention, the terms "first" and "second", etc., are used only for a distinguishing purpose, and should not be comprehended as indicating or implying any relative importance.

Apparently, the examples described herein are only a part of examples of the invention rather than all examples of the present invention. Those of ordinary skill in the art can obtain other examples on the basis of the examples described herein without expending any creative labor; however, all such examples shall be deemed as falling in the scope of protection of the present invention.

In order to solve the problems existing in the prior art, the embodiments of the present invention provide a parallel electrical connection structure for battery poles, which comprises a common adjusting busway and a plurality of electrically connecting branches, wherein both the common adjusting busway and the electrically connecting branches are conductors; each of the electrically connecting branches has a first end and a second end; the first end of each electrically connecting branch is configured to be electrically connected to the poles of the same polarity of a plurality of individual batteries or the electrically connecting elements of the poles of the same polarity of the plurality of individual batteries, and the second end of each electrically connecting branch is electrically connected to the common adjusting busway; the poles of the same polarity of different individual batteries are connected in shunt via the common adjusting busway and the electrically connecting branches; the common adjusting busway and each electrically connecting branch are insulated from the poles of the individual batteries, except the first end of each electrically connecting branch; the cross section of each electrically connecting branch is smaller than the cross section of the common adjusting busway; alternatively, the current carrying capacity of each electrically connecting branch is lower than the current carrying capacity of the common adjusting busway.

Example 1

In Example 1, a parallel electrical connection structure 20 for battery poles is provided. The parallel electrical connection structure 20 for battery poles is used to prepare individual batteries 10 into a CTP module in which the batteries are connected in series in the rows and connected in shunt between the rows. The parallel electrical connection structure 20 for battery poles is especially applicable to prepare high-power power battery units in new energy vehicles or large-size energy storage systems, and is also applicable to low-speed electric vehicles, electric bicycles, and other low-power energy storage products.

In this example, the individual batteries 10 are power batteries having high energy density, and may be selected from Type 18650, Type 21700, and Type 46800 cylindrical batteries, but are not limited to those batteries. It should be understood by those skilled in the art that individual batteries 10 of any size are applicable to the technical solution of this example, such as cylindrical individual batteries 10, square batteries, pouch batteries, or cylindrical batteries having a cross section in a rounded rectangular shape, rounded triangular shape, or rounded polygonal shape, and all such batteries may be regarded as the individual batteries 10.

As shown in FIGS. 1 to 6, the parallel electrical connection structure 20 in this example may be provided without the individual batteries 10 shown in the figures; instead, the parallel electrical connection structure 20 may be provided separately as a structure for grouping the individual batteries 10.

The parallel electrical connection structure 20 in this example essentially comprises at least a common adjusting busway 201 and a plurality of electrically connecting branches 202, wherein both the common adjusting busway 201 and the electrically connecting branches 202 are conductors; each of the electrically connecting branches 202 has a first end and a second end, wherein the first end is configured to be electrically connected to the pole of the same polarity of each individual batter 10 or the electrically connecting element of the pole of the same polarity of each individual battery 10, the second end is configured to be electrically connected to the common adjusting busway 201, and the poles of the same polarity of different individual batteries 10 are connected in shunt by the common adjusting busway 201 and the electrically connecting branches 202. Preferably, the common adjusting busway 201 and the electrically connecting branches 202 are insulated from the poles of the individual batteries 10, except the first ends of the electrically connecting branches 202.

In an embodiment, the common adjusting busway 201 and the plurality of electrically connecting branches 202 are formed from a metal busbar in uniform thickness by punching or cutting, and the cross-sectional area of the common adjusting busway 201 is greater than the cross-sectional area of each electrically connecting branch 202, which is to say, the width of the common adjusting busway 201 is greater than the width of the electrically connecting branch 202, to ensure that the current carrying capacity of the common adjusting busway 201 is higher than the current carrying capacity of the electrically connecting branch 202. Preferably, the first end of the electrically connecting branch 202 is electrically connected to the pole of the individual battery 10 through a cold-welding adhesive bonding process, with conductive adhesive that cures at normal temperature as the filler material, to prevent the inherent quality of the individual battery 10 from being affected by external heat via the battery poles. Optionally, the common adjusting busway 201 is externally coated with an insulating layer, or the common adjusting busway 201 is at least arranged on a large insulating plate 204 for insulation between the common adjusting busway 201 and the individual batteries 10; the external of the electrically connecting branch 202 is usually insulated by means of a sleeve or by hanging in the air, or by being fixed to an insulating structural element, to ensure a successful over-current fusing process. Preferably, usually there is no restriction on the material and thickness of two conductors to be electrically connected through a cold-welding adhesive bonding process for electrical connection. It should be understood by those skilled in the art that the effect of heat on the battery poles can be avoided by using a cold-welding adhesive bonding process with conductive adhesive.

In another embodiment, the first ends are electrically connected to the poles of the individual batteries 10 or electrically connecting element on the poles, the second ends are electrically connected to the common adjusting busway 201; the electrical connections of the first ends and the second ends are achieved respectively through an ultrasonic jump wire bridging process between the first ends and the second ends, so that the electrically connecting branches 202 are formed between the first ends and the second ends simultaneously. Those skilled in the art should understand: when an ultrasonic jump wire bridging process is used, two conductors to be electrically connected are electrically connected by fusing conductive wires (e.g., aluminum wires) in a molten state to the surfaces of the conductors respectively; therefore, the first end and the second end must be made of the same material, such as aluminum, copper, nickel, or the like, to ensure the uniformity of penetration depth of the welding spot and the reliability of the fusion bonding.

Preferably, the plurality of electrically connecting branches 202 have the same electrical resistance; then the resistance difference between the parallel branches of the plurality of individual batteries 10 formed via the parallel electrical connection structure 20 depends on the resistance difference among the batteries. The internal resistance of a battery is a basic characteristic index of the individual battery 10. Before the grouping of the individual batteries 10, appropriate individual batteries 10 may be selected by judging the resistance difference in advance to form a parallel battery bank. Besides, the parallel electrical connection structure 20 is easy to prepare.

Preferably, the current carrying capacity of the common adjusting busway 201 is equal to or greater than the sum of the current carrying capacities of n−1 electrically connecting branches 202, where n is the number of the individual batteries 10 in the parallel battery bank. In the case that thermal runaway occurs in one individual battery 10 of the n individual batteries 10, a short circuit phenomenon will occur in the battery with thermal runaway, and then all other n−1 individual batteries 10 in normal operating states that are connected in shunt with the battery with thermal runaway will transfer respective incremental currents in the transverse direction to the individual battery 10 with thermal runaway through respective electrically connecting branches 202 and the common adjusting busway 201. The maximum current increment in the common adjusting busway 201 is the sum of the incremental currents in the electrically connecting branches 202 electrically connected to the n−1 batteries 10 in normal operating states. To prevent the electrically connecting branch 202 electrically connected to each battery 10 in normal operating states and the common adjusting busway 201 from fused owing to over-current or ensure that they still be in a normal operating state and a normal thermal state under the heat generated due to an over-current state, the current carrying capacity of the common adjusting busway 201 should be at least the sum of the current carrying capacities of the n−1 electrically connecting branches 202.

Example 2

A plurality of individual batteries 10 are prepared into a parallel battery bank by using the parallel electrical connection structure 20 for battery poles in Example 1. The structure of the parallel battery bank is described in Example 2 with reference to FIGS. 1-4. The features of the parallel electrical connection structure 20 for battery poles that have been included in the Example 1 are naturally inherited in this example.

Figure 2:
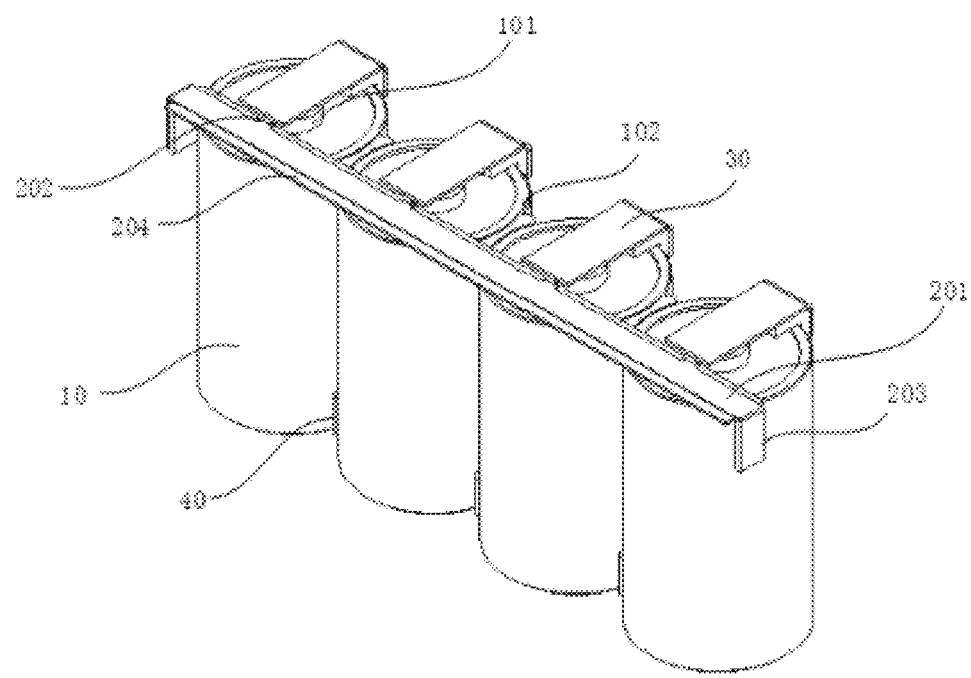
FIG. 2 is a schematic structural diagram of the parallel battery bank disclosed in example 2 of the present invention.
Figure 3:
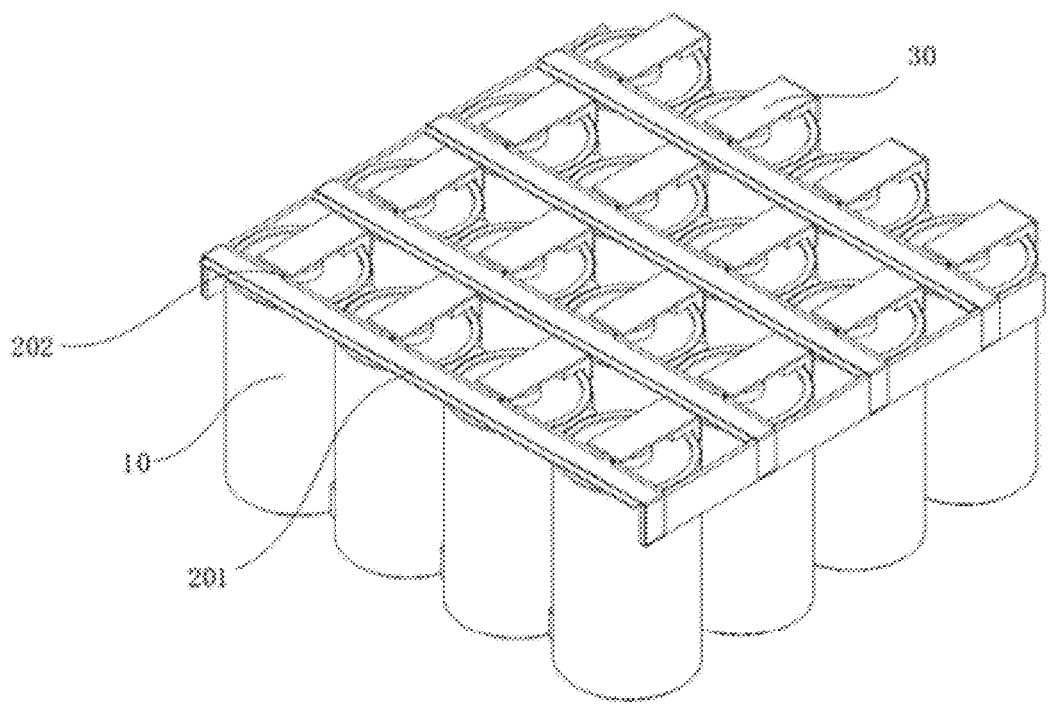
FIG. 3 is a perspective view of the structure of the battery pack disclosed in examples 3 to 4 of the present invention.
Figure 4:
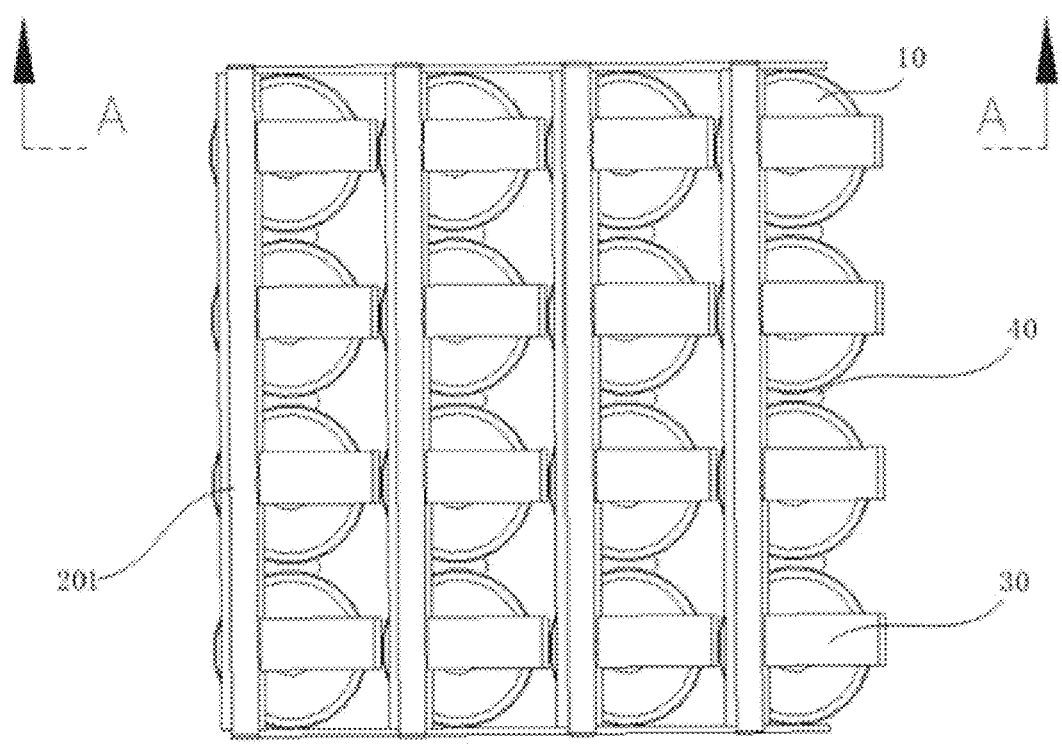
FIG. 4 is a top view of the battery pack disclosed in examples 3 to 4 of the present invention.
Figure 5:
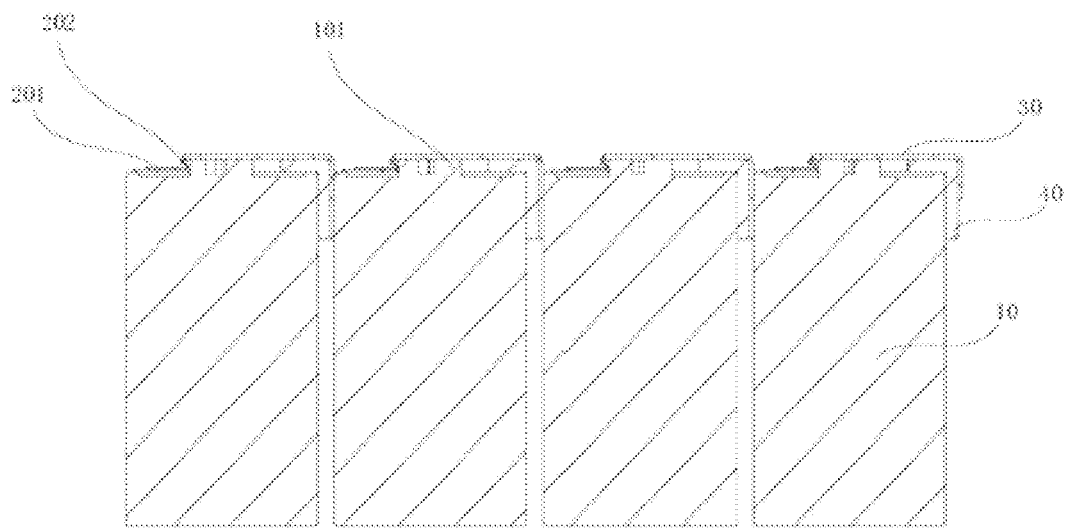
FIG. 5 is a cross-sectional view taken along the line A-A of FIG. 4.
Figure 6:
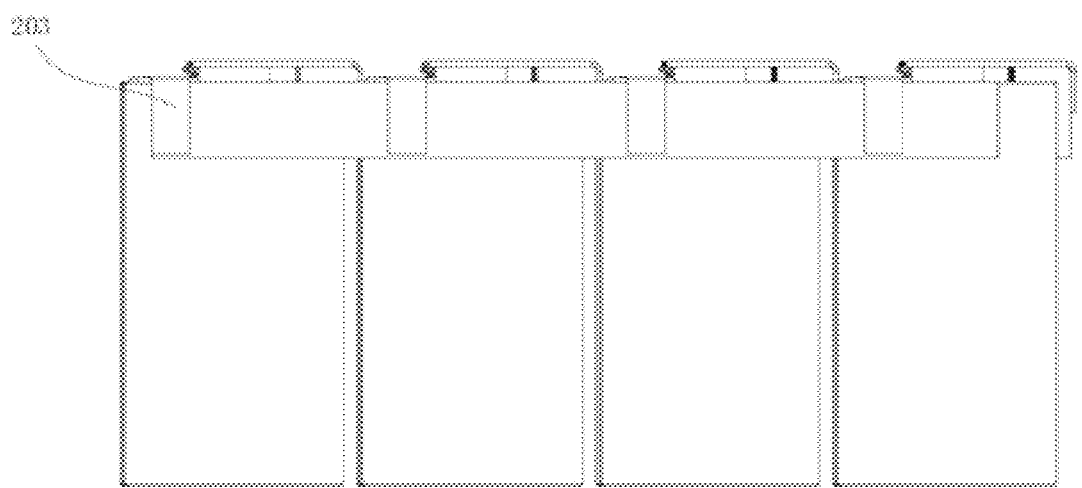
FIG. 6 is a front view of the battery pack disclosed in examples 3 to 4 of the present invention.

As shown in FIG. 2, the parallel battery bank described in Example 2 is formed by a plurality of individual batteries 10 aligned side by side, and all the individual batteries 10 are arranged in the same orientation. In this example, every individual battery 10 in each parallel battery bank is from an individual battery 10 in a different series structure, and the plurality of series structures are connected in shunt.

Preferably, in a parallel battery bank, each individual battery 10 comprises a first pole and a second pole, the first pole and the second pole correspond to the two electrical poles of the individual battery 10 respectively; in one embodiment, the first pole is the top pole 101 of the individual battery 10, and the second pole is the shell pole 102 of the individual battery 10; in another embodiment, the first pole is the shell pole 102 of the individual battery 10, and the second pole is the top pole 101 of the individual battery 10.

Preferably, the first poles of a plurality of individual batteries 10 are connected in shunt via the parallel electrical connection structure 20 for battery poles in Example 1, and the second poles of the plurality of individual batteries 10 are connected in shunt.

In a preferred embodiment, the parallel electrical connection structure 20 for battery poles is made of a metal busbar by punching and cutting, and comprises a common adjusting busway 201 and a plurality of electrically connecting branches 202, wherein a downward bending portion of the two ends of the common adjusting busway 201 is a bending structure 203, which are generally flat strip-shaped for connecting the connection points of a plurality of external circuits respectively or together for monitoring the voltage and capacity of a parallel battery bank. The downward bending is helpful for reducing the total width of the parallel battery bank; the portion of the common adjusting busway 201 in the parallel battery bank may be cylindrical or strip-shaped, preferably, the bending structures 203 are generally flat strip-shaped in the width direction of the parallel battery bank to reduce the width of the parallel busbar.

Preferably, the common adjusting busway 201 is a cylindrical structure made of a flat conductor by rolling in multiple layers, each of the electrically connecting branches 202 is a single-layer structure formed by a plurality of plates made from the same flat conductor by die-cutting and integrated with the flat conductor, and extends to one side. To ensure that the current carrying capacity of the electrically connecting branch 202 is lower than the current carrying capacity of the common adjusting busway 201, the width of the electrically connecting branch 202 is adjusted to be smaller than the width of the flat conductor unrolled from the common adjusting busway 201; the other end of each electrically connecting branch 202 is electrically connected to the first pole or an electrically connecting element on the first pole of an individual battery 10 by means of conductive adhesive; thus, each electrically connecting branch 202 forms a branch circuit connected in series with the corresponding individual battery 10 between the common adjusting busway 201 and the second poles in shunt of a plurality of individual batteries 10; the plurality of branch circuits electrically connected to the common adjusting busway 201 are connected in shunt to form a plurality of parallel battery branches; preferably, the intervals between the parallel battery branches is equivalent to the intervals between the individual batteries 10, preferably, the intervals between the individual batteries 10 are the same; referring to FIG. 2, the electrically connecting element is the series busbar 30, which is a bending conductor or solid conductor electrically connected to the poles having different polarities of the adjacent individual batteries 10 in the direction of the series battery bank with cold-welding adhesive.

Preferably, the electrical resistance of the electrically connecting branch 202 of each parallel battery branch may be adjusted reversely according to the inherent internal resistance of the individual batteries 10, so as to further decrease the resistance difference between the parallel battery branches, i.e., the resistance difference in a parallel battery bank may be smaller than or equal to the inherent resistance difference among the individual batteries 10 in the parallel battery bank.

In an optional embodiment, for example, for a 4P parallel battery bank, when thermal runaway occurs in one individual battery 10 in the parallel battery bank, if the internal resistance is decreased by 20% in the early stage of the thermal runaway, the current between the internal poles of the individual battery 10 will be increased by 20%, but the current doesn't flow through the external positive pole and negative pole of the individual battery 10; the increments of the current transferred from the other three normal individual batteries 10 through their respective electrically connecting branches 202 to the common adjusting busway 201 are 20% respectively, the current increment in the common adjusting busway 201 is 3×20%, and the current reaches the electrically connecting branch 202 of the individual battery 10 with thermal runaway, the current increment in the electrically connecting branch 202 of the individual battery 10 with thermal runaway is 3×20%. After the incremental currents are superposed, the electrically connecting branch 202 of the individual battery 10 with thermal runaway is fused and burnt owing to the overcurrent, and the electrically connection of the battery with thermal runaway to the parallel battery bank is broken. Since the 1×20% incremental current in the electrically connecting branches 202 of the normal individual batteries 10 and the 3×20% incremental current in the common adjusting busway 201 haven't reached the design current carrying limits of the electrically connecting branches 202 and the common adjusting busway 201, the electrically connecting branches 202 of the normal individual batteries 10 and the common adjusting busway 201 are not fused but can still operate normally. After the battery with thermal runaway is disconnected, the incremental currents in the electrically connecting branches 202 of the normal individual batteries 10 disappear, and the three normal batteries continue to keep a shunt state and supply power externally.

Example 3

Referring to FIGS. 3-6, a battery pack is provided in this example. The battery pack comprises a parallel electrical connection structure 20 for battery poles as described in Example 1 and a plurality of series battery banks, each of the series battery banks is formed by a plurality of aforementioned individual batteries 10 aligned side by side, and each individual battery 10 comprises a top pole 101 and a shell pole 102, which are the two electrical poles of the individual battery 10 respectively.

Preferably, in each series battery bank, four individual batteries 10 are connected in series by electrically connecting the top pole 101 and the shell pole 102 of the adjacent battery through a series busbar 30; four series battery banks are arranged to a row in the same orientation, thereby a 4×4 array is obtained. Of course, those skilled in the art should understand that the battery pack may be a 6×4 battery array, 8×4 battery array, 10×4 battery array, 8×20 battery array, or 8×40 battery array, etc. There is no restriction on the expansion of a battery pack in the transverse direction and the longitudinal direction in this example.

Preferably, in the series battery bank, the series busbar 30 extending out of the battery shells has a downward bending structure, the bending structure covers the upper ends of some shells but is insulated from the upper end portion of the shells; preferably, by applying pressure to the two ends of the series battery bank, the bending structure of a series busbar 30 for one individual battery 10 is electrically connected to the upper end portions of the shell of the adjacent individual batteries 10 via conductive adhesive; preferably, in the series battery bank, structural adhesive 40 is applied between the sides or top cover or the bottom of each individual battery 10, to maintain a stable and reliable structure of the series battery bank.

Preferably, the top poles 101 of the plurality of individual batteries 10 adjacent to each other in the first place of a plurality of series battery banks are connect in shunt via the parallel electrical connection structure 20, and the shell poles 102 of the plurality of individual batteries 10 adjacent to each other in last place of the plurality of series battery banks are connected in shunt, so as to form a battery pack in which the plurality of series battery banks are connected in shunt.

Preferably, a metal busbar is used as the common adjusting busway 201 in the parallel electrical connection structure 20, and the external of the metal busbar is provided with an insulating structure; there are a plurality of short strip-shaped conductors electrically connected on the common adjusting busway 201 as electrically connecting branches 202; preferably, the spacing between the electrically connecting branches 202 matches the bank spacing between the series battery banks.

Preferably, the first end of each electrically connecting branch 202 is electrically connected to the top poles 101 of the individual batteries 10 or the series busbar 30 via conductive adhesive, so that the top poles 101 of all adjacent individual batteries 10 in the same battery bank in the transverse direction are connected in shunt; preferably, other areas of the electrically connecting branch 202 are also provided with an insulating structure except the electrically connection point of the first end, and a structural adhesive 40 is provided on the insulating structure; thus, the electrically connecting branch 202 is connected integrally to the top poles 101 or the series busbar 30 via the insulating structure and the structural adhesive 40.

Preferably, the metal busbar serving as the common adjusting busway 201 is fixedly connected to the batteries via the insulating structure external to the metal busbar and the structural adhesive 40.

It should be understood by those skilled in the art that the structural adhesive 40 may be regarded as an insulating material, and it can create voids and insulation between the individual batteries 10, between the individual batteries 10 and the parallel electrical connection structure 20, and between the individual batteries and the series busbar 30, so as to improve the squeezing resistance performance and avoid undesired contact between adjacent structures under impacts.

Example 4

In this example, the parallel electrical connection structure 20 for battery poles described in Example 1 and the manufacturing process of the battery pack described in Example 3 are detailed. It should be understood that a battery pack without the parallel electrical connection structure 20 for battery pole may also be referred to as a battery pack.

1. Preparing Series Battery Banks

Electrically connecting a series busbar 30 to the top poles 101 of the individual batteries 10;

Arranging a plurality of individual batteries 10 having the series busbar 30 to a row in the same orientation;

Applying at least an insulating structural adhesive 40 between adjacent individual batteries 10 in the row to create voids between the lateral shells of the individual batteries 10, maintaining the lateral shells of adjacent individual batteries 10 parallel to each other, so as to improve the squeezing resistance performance, and avoid undesired contact between the adjacent lateral shells under impacts;

Electrically connecting a series busbar 30 to the top poles 101 of adjacent individual batteries 10, and electrically connecting the bending structures 203 of the series busbar 30 to the shell poles 102 of adjacent individual batteries 10 through conductive adhesive; the conductive adhesive is preferably a conductive adhesive that cures at normal temperature, and is used to increase the contact area of electrically connections in the series battery bank and stabilize the electrical flux of the electrically connection points after it cures;

Structural adhesive 40 is applied and cured between the lateral shells of adjacent individual batteries 10, so as to prepare and obtain a series battery bank in which the individual batteries 10 are arranged to a row side by side in the longitudinal direction;

The above steps are repeated to obtain a plurality of series battery banks;

2. Preparing Parallel Electrical Connection Structures 20

A metal busbar is used as the common adjusting busway 201; there are a plurality of short metal strips electrically connected on the metal busbar as the electrically connecting branches 202 for the corresponding series battery banks; the spacing between the electrically connecting branches 202 is equivalent to the bank spacing between the series battery banks;

The external of the metal busbar is coated with an insulating layer, or the metal busbar is stably arranged on a large insulating plate 204 in length equivalent to the width of the battery pack;

A small insulating plate is stably arranged on the bottom metal surface of the first end of each electrically connecting branch 202, the width of the small insulating plate is greater than the width of the electrically connecting branch 202, and structural adhesive 40 is applied to the portion that is widen out of the two sides; preferably, both the large insulating plate 204 and the small insulating plates are made of a transparent insulating material;

Conductive adhesive that cures at normal temperature is applied on the upper metal surface of the first end of each electrically connecting branch 202;

Thus, a parallel electrical connection structure 20 for battery poles is obtained;

The above steps are repeated to obtain a plurality of parallel electrical connection structures 20;

3. Preparing a Battery Pack in which any Individual Battery with Thermal Runaway can be Fused and Electrically Isolated in a Parallel Battery Bank A plurality of above-mentioned series battery banks are arranged in parallel, at least one structural adhesive 40 is applied between adjacent individual batteries 10 in adjacent series battery banks and the structural adhesive 40 is cured, so as to obtain a battery array structure in which the individual batteries 10 adjacent to each other in the rows are insulated and the structure is stable;

The series busbars 30 on the top poles 101 of the individual batteries 10 adjacent to each other in a row in the last place in the plurality of series battery banks in the transverse direction are connected in shunt, to form an external top pole of the battery pack;

The common adjusting busway 201 of a parallel electrical connection structure 20 is fixed to the plurality of individual batteries 10 that are adjacent to each other in a row in the transverse direction; the first end of each electrically connecting branch 202 is electrically connected to the top pole 101 of each individual battery 10 through a cold-welding adhesive bonding structure with conductive adhesive, so that the top poles 101 of the plurality of individual batteries 10 adjacent to each other in the same row in the transverse direction are connected in shunt;

A plurality of parallel electrically connecting elements 20 are mounted on the top poles 101 of the plurality of individual batteries 10 adjacent to each other in different rows in the transverse direction, so that the top poles 101 of the individual batteries 10 adjacent to each other in the plurality of rows in the transverse direction are connected in shunt;

The shell poles 102 of the batteries adjacent to each other in the first place of the plurality of series battery banks are connected in shunt, to form an external shell pole of the battery pack;

Thus, a battery pack having a stable structure is obtained, in which the batteries are connected in series in the longitudinal direction and connected in shunt in the transverse direction, and any individual battery with thermal runaway can be isolated from the parallel battery bank by overcurrent fusing.

The conductive adhesive cures at normal temperature, and all cold-welded electrically connection points are stable.

While some examples of the present invention are described above with reference to the accompanying drawings, the present invention is not limited to those embodiments. The embodiments described above are only illustrative rather than limiting. Various modifications and alternations may be made by those having ordinary skills in the art under the inspiration of the present invention without departing from the spirit of the present invention and the scope of protection defined by the claims. However, all of such modifications and alternations shall be deemed as falling in the scope of protection of the present invention.

The invention claimed is:

1. A battery pack, comprising:
a plurality of series battery banks, each of the series battery banks is formed by arranging a plurality of individual batteries having a series busbar side by side, wherein each of the individual batteries comprises a first pole and a second pole, the first pole and the second pole are the two electrical poles of the individual battery; the first poles and the second poles of adjacent individual batteries are electrically connected to two ends of the series busbar respectively;
at least the first poles of the plurality of individual batteries adjacent to each other in different series battery banks are connected in shunt via a parallel electrical connection structure for the battery poles to form an external first pole of the battery pack, and at least the second poles of the plurality of individual batteries adjacent to each other in different series battery banks are connected in shunt to form an external second pole of the battery pack; the parallel electrical connection structure for battery poles comprises a common adjusting busway and a plurality of electrically connecting branches; each of the electrically connecting branches has a first end and a second end; the first end of each electrically connecting branch is configured to be electrically connected to the first pole of one individual battery in a different series battery bank, and the second end of each electrically connecting branch is electrically connected to the common adjusting busway, so that a plurality of the first poles of the plurality of individual batteries adjacent to each other in a row in a transverse direction are connected in shunt; the common adjusting busway and the electrically connecting branches are insulated, except that the first ends of the electrically connecting branches are electrically connected to the first poles of the individual batteries; a current carrying capacity of the common adjusting busway is greater than or equal to a sum of the current carrying capacities of n−1 electrically connecting branches, where n is the number of electrically connecting branches electrically connected to the common adjusting busway; and when thermal runaway happens in an individual battery connected to the electrically connecting branch, the electrically connecting branch will be fused and burnt, so that the individual battery is electrically isolated from the parallel battery bank in which the individual battery is situated.

2. The battery pack according to claim 1, wherein the first end of the electrically connecting branch is electrically connected to the first pole through a cold-welding adhesive bonding process with conductive adhesive.

3. The battery pack according to claim 1, wherein the plurality of electrically connecting branches have the same electrical resistance.

4. The battery pack according to claim 1, wherein the common adjusting busway and the plurality of electrically connecting branches are formed from a metal busbar having uniform thickness by punching; and the width of the common adjusting busway is greater than the width of each of the electrically connecting branches.

5. The battery pack according to claim 1, wherein the first ends and the second ends are electrically connected through an ultrasonic jump wire bridging process between the first poles electrically connected to the first ends and the common adjusting busway electrically, connected to the second ends, so that the electrically connecting branches are formed simultaneously.

6. A method for manufacturing the battery pack according to claim 1, comprising:
preparing a plurality of series battery banks having a series busbar respectively;
preparing a parallel electrical connection structure for battery poles;
arranging the plurality of series battery banks in parallel, and at least applying insulating structural adhesive and curing the insulating structural adhesive between adjacent individual batteries in different series battery banks, so as to obtain a battery array structure in which adjacent individual batteries are insulated from each other and the structure is stable;
fixing the common adjusting busway of the parallel electrical connection structure for battery poles to the individual batteries adjacent to each other in the same row in the transverse direction; electrically connecting each electrically connecting branch to the top pole of each individual battery through a cold-welding, adhesive bonding structure with conductive adhesive, so that the top poles of the individual batteries adjacent to each other in the same row in the transverse direction are connected in shunt;

connecting the top poles of the individual batteries adjacent to each other in each of the plurality of rows in the transverse direction in shunt sequentially; and preparing and obtaining a battery pack having a stable structure, in which the single batteries are connected in series in the longitudinal direction and connected in shunt in the transverse direction, and any individual battery with thermal runaway can be isolated from the parallel battery bank by over-current fusing.

7. The method for manufacturing a battery pack according to claim 6, wherein the step of preparing a plurality of series battery banks having a series busbar respectively, further comprises:

arranging a plurality of individual batteries having a series busbar in a row in the same orientation;

at least applying insulating structural adhesive between adjacent individual batteries;

electrically connecting the top pole and shell pole of adjacent individual batteries to the two ends of the series busbar respectively;

curing the structural adhesive to obtain a series battery bank in which the individual batteries are adjacent to each other in a row in the longitudinal direction; and preparing and obtaining a plurality of series battery banks.

8. The method for manufacturing a battery pack according to claim 7, wherein the step of preparing the parallel electrical connection structure for battery poles further comprises:

using a metal busbar coated with an insulating material as the common adjusting busway;

using a plurality of short metal strips electrically connected on the metal busbar as the electrically connecting branches of the parallel individual batteries adjacent to each other between corresponding adjacent series battery banks;

applying conductive adhesive on the upper metal surface of the first end of each electrically, connecting branch;

preparing and obtaining a parallel electrical connection structure for battery poles, which has a plurality of electrically connecting branches and a common adjusting busway; and preparing and obtaining a plurality of parallel electrical connection structures for battery poles.

* * * * *